(12) United States Patent
Ismert et al.

(10) Patent No.: US 9,725,892 B2
(45) Date of Patent: Aug. 8, 2017

(54) PLUMBING SUPPLY LINE MOUNTING AND FINISH PANEL ASSEMBLY

(71) Applicants: Brian E. Ismert, Lone Jack, MO (US); Joseph P. Ismert, Kansas City, MO (US)

(72) Inventors: Brian E. Ismert, Lone Jack, MO (US); Joseph P. Ismert, Kansas City, MO (US)

(73) Assignee: SIOUX CHIEF MFG. CO., INC., Peculiar, MO (US)

( * ) Notice: Subject to any disclaimer, the term of this patent is extended or adjusted under 35 U.S.C. 154(b) by 207 days.

(21) Appl. No.: 14/725,857

(22) Filed: May 29, 2015

(65) Prior Publication Data

US 2015/0259891 A1 Sep. 17, 2015

Related U.S. Application Data

(63) Continuation-in-part of application No. 13/096,093, filed on Apr. 28, 2011, now Pat. No. 9,057,460.

(51) Int. Cl.
| | |
|---|---|
| *E03C 1/00* | (2006.01) |
| *E03C 1/12* | (2006.01) |
| *F16L 5/10* | (2006.01) |
| *E03C 1/02* | (2006.01) |
| *F16L 5/14* | (2006.01) |

(52) U.S. Cl.
CPC .............. *E03C 1/12* (2013.01); *E03C 1/021* (2013.01); *F16L 5/10* (2013.01); *F16L 5/14* (2013.01); *E03C 2001/028* (2013.01); *Y10T 137/698* (2015.04)

(58) Field of Classification Search
CPC ...... E03C 1/12; E03C 1/021; E03C 2001/028; F16L 5/14; F16L 5/10; Y10T 137/698
USPC .......................................................... 137/360
See application file for complete search history.

(56) References Cited

U.S. PATENT DOCUMENTS

| | | | | |
|---|---|---|---|---|
| 2,295,888 | A | | 9/1942 | Bucknell et al. |
| 3,009,167 | A | | 11/1961 | Leonard, Jr |
| 3,148,698 | A | * | 9/1964 | Arnold .................... D06F 39/08 137/360 |
| 3,847,175 | A | * | 11/1974 | Anderson ................. E03C 1/00 137/360 |
| 4,363,337 | A | * | 12/1982 | Pease .................. A47L 15/4217 137/343 |
| 4,420,022 | A | * | 12/1983 | Landry ..................... F17C 5/02 137/382 |
| 4,564,249 | A | * | 1/1986 | Logsdon ................. D06F 39/08 137/360 |
| 5,050,632 | A | * | 9/1991 | Means, Jr. ............. E03C 1/021 137/360 |

(Continued)

*Primary Examiner* — Eric Keasel
(74) *Attorney, Agent, or Firm* — Erickson Kernell IP, LLC

(57) ABSTRACT

A plumbing finish panel assembly, for connecting a water supply line in a wall to fixture supply lines, comprises a mounting panel having a supply line opening formed therethrough and a finish ring for presenting a clean finished appearance to the assembly. A supply line connector assembly is securable to the mounting panel through the supply line opening and enables selective orientation of a tailpiece for connection to the supply line. An outlet end of the supply line connector assembly provides a threaded coupling to which a valve or hose may be coupled. The panel assembly may be provided in plate or box configuration.

26 Claims, 12 Drawing Sheets

(56) References Cited

U.S. PATENT DOCUMENTS

| | | |
|---|---|---|
| 5,309,579 A | 5/1994 | Nelson |
| 5,605,359 A * | 2/1997 | Hoff .................. F16L 33/00 |
| | | 285/259 |
| 5,653,254 A | 8/1997 | Condon et al. |
| 5,755,247 A | 5/1998 | Condon |
| 6,129,109 A | 10/2000 | Humber |
| 6,234,193 B1 | 5/2001 | Hobbs et al. |
| 6,698,103 B2 | 3/2004 | Nortier et al. |
| 6,860,070 B2 | 3/2005 | Gilleran |
| 7,204,267 B1 | 4/2007 | Persico |
| 7,357,148 B1 | 4/2008 | Gibson |
| 7,614,419 B2 | 11/2009 | Minnick |
| 2005/0067017 A1 | 3/2005 | Condon et al. |
| 2010/0000614 A1 | 1/2010 | Zahuranec et al. |

* cited by examiner

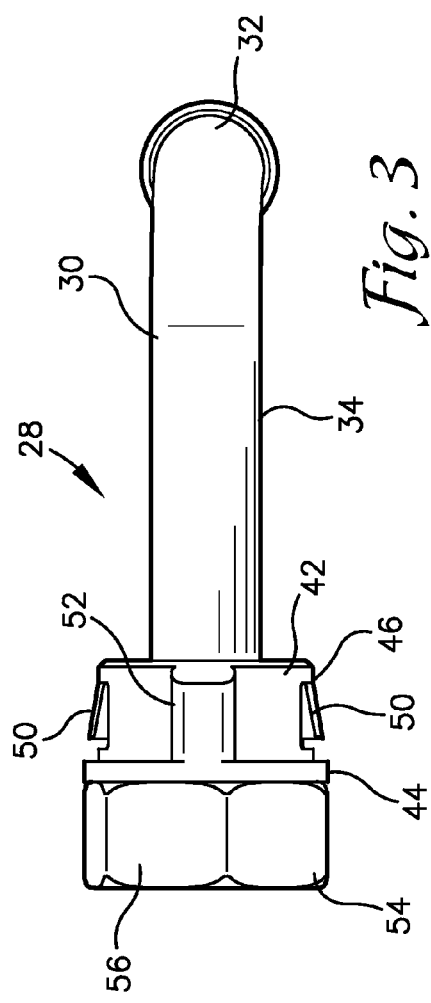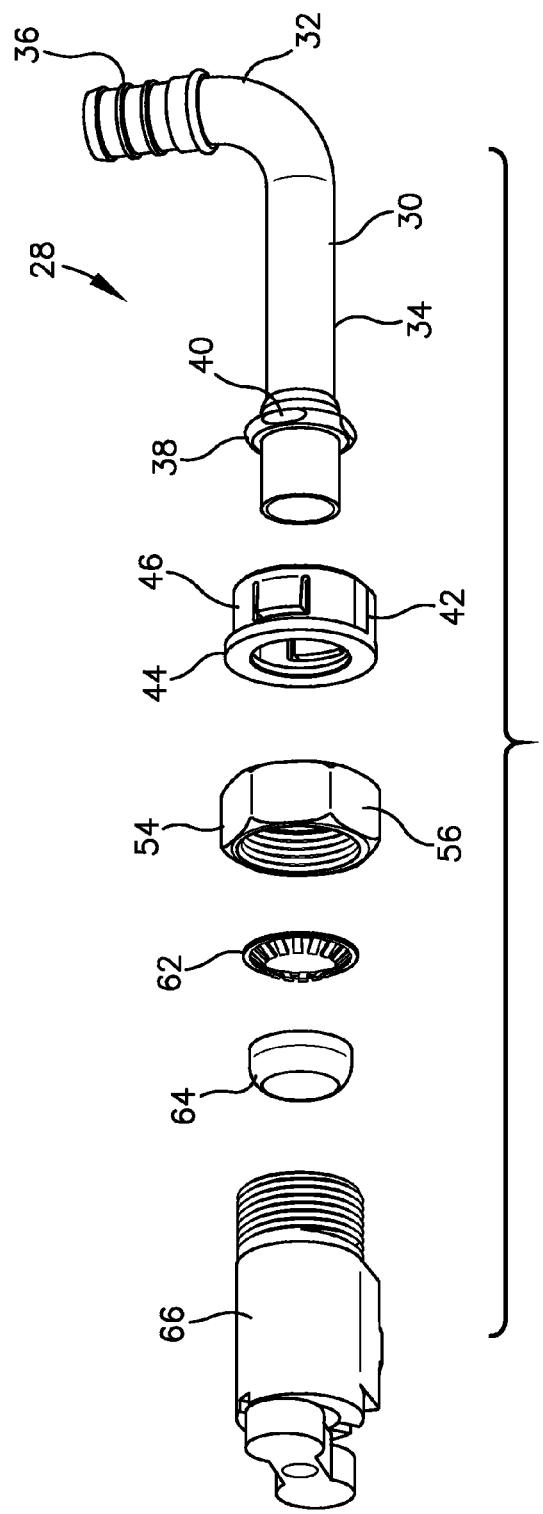

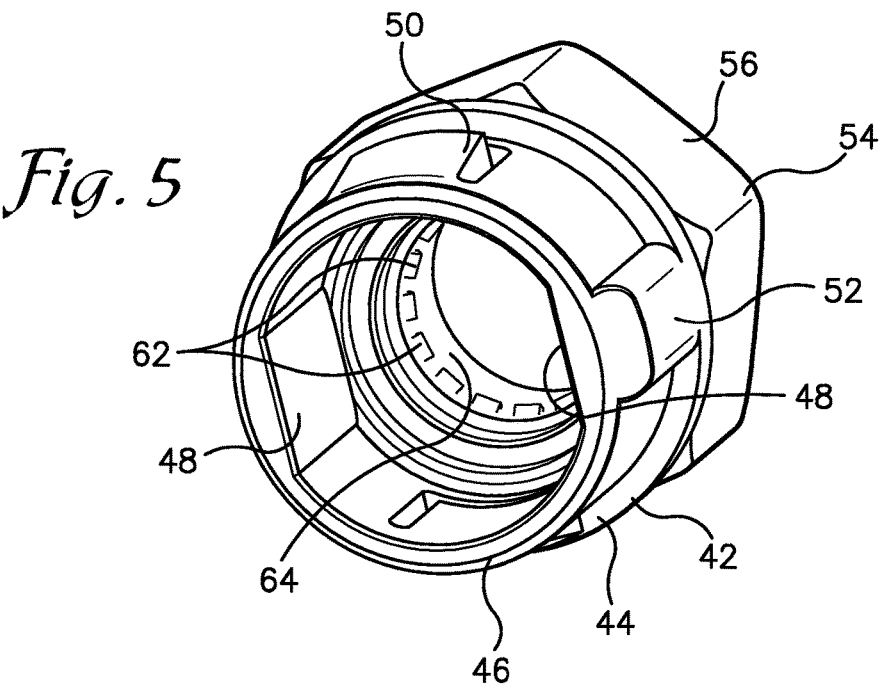
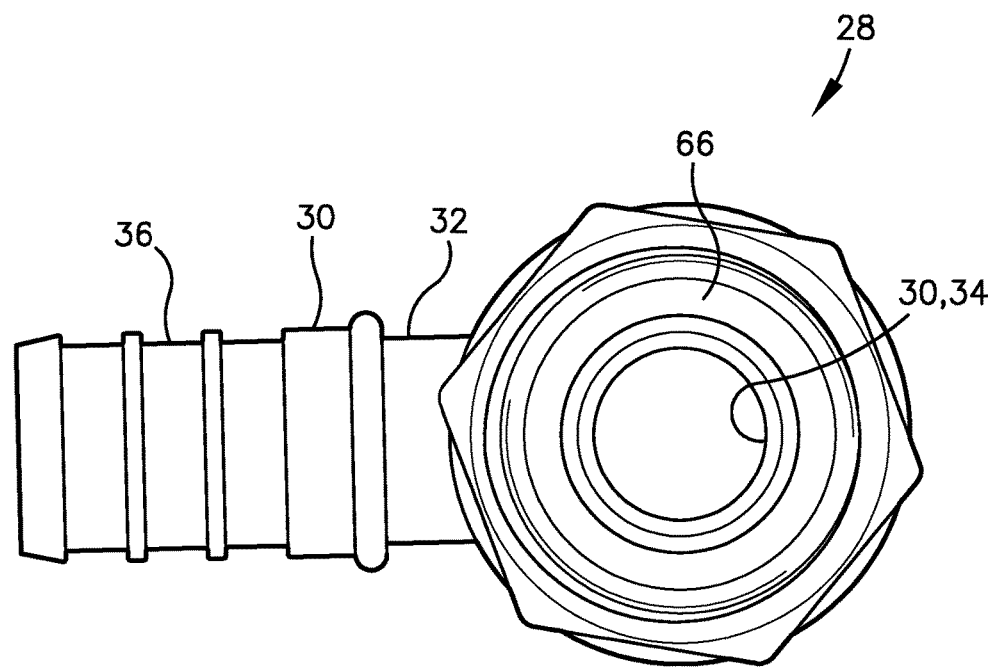

US 9,725,892 B2

PLUMBING SUPPLY LINE MOUNTING AND FINISH PANEL ASSEMBLY

CROSS-REFERENCE TO RELATED APPLICATIONS

This application is a continuation-in-part and claims the benefit of U.S. patent application Ser. No. 13/096,093, filed Apr. 28, 2011 and titled Plumbing Supply Line and Drain Line Mounting and Finish Plate, the disclosure of which is hereby incorporated herein in its entirety by reference.

BACKGROUND

Tying in supply lines and the drain line for sinks, lavatories, and washing machines in a stud wall can be a difficult and time consuming exercise, particularly where the connection of the supply and drain lines through the wall are exposed beneath the sink. A wide variety of brackets, straps and the like are available for supporting and holding hot and cold water supply lines within a stud bay at the location where the supply lines will extend through holes formed in dry wall attached over the studs forming the stud wall. The branch of a drain line to which the sink drain is to be connected is typically self-supported off of a vertically extending drain line.

Finishing a wall around the drain line can prove difficult and time consuming, particularly if the drain line is stubbed out through the wall at an angle other than ninety degrees relative to the wall. In such circumstances, the dry-wall installer is required to make a relatively large hole to accommodate the angled length of drain line, requiring more repair work after the dry wall is secured to the stud wall. The installer then typically places separate escutcheons around each supply line and drain line and over the respective openings through the drywall to cover any gaps therebetween.

Finish boxes have been developed which include openings for tying in supply lines and a drain line through a wall panel and which present a relatively clean appearance to the wall once dry wall is mounted over or around the box. U.S. Pat. No. 5,653,144 to Condon discloses such a box. The box includes a floor panel with two openings which, when the box is mounted as intended in a stud wall, extend through the floor panel generally perpendicular to the vertical opening into the box. A sleeve, through which a drain line elbow may extend, is formed in a back panel of the box and extends forward therefrom. The sleeve extends above the bottom panel and the supply line openings extend therethrough. Quarter turn or angle stop valves are mounted to the bottom panel with a pipe connection shank extending vertically below the bottom panel.

Although the orientation of the box can be changed to accommodate variations in the direction that the water supply lines and the drain line are plumbed to the box, the variations are limited. The box can generally be oriented in one of only four orientations, with the floor panel below the drain sleeve and the pipe connection shanks extending downward, with the floor panel above the drain sleeve and the pipe connection shanks extending upward, with the floor panel to the left of the drain sleeve and the pipe connection shanks extending to the left and with the floor panel to the right of the drain sleeve and the pipe connection shanks extending to the right. Correspondingly, the supply lines and the drain line generally have to be plumbed in one of four orientations. There are numerous instances where due to the direction from which the supply lines and the drain line are plumbed, that use of the box taught in the Condon '144 patent is not possible.

In addition, in boxes such as are taught by Condon '144, it is very difficult to fit tools into the box to try to remove and replace the valve body if it develops a leak or otherwise fails. Then once a new valve is obtained, it becomes difficult to install the valve by threading it onto a threaded receiver in the box while getting the supply line outlet of the valve to face forward without over or under tightening the valve body to the threaded receiver or without damaging the supply line connected thereto past the floor panel.

There remains a need for a finish panel system or the like which can accommodate a wide variety of situations regarding the location of supply lines and the drain line and which permits ready removal and replacement of supply line valves.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a plumbing finish panel assembly for covering an opening in a wall panel through which a supply line extends.

The plumbing finish panel assembly comprises a mounting panel having a supply line opening formed therethrough and a finish collar. The mounting panel can be mounted behind a wall surface or wallboard member with a portion of the mounting panel extending through the wallboard member. The finish collar is coupled to the mounting panel from an opposite side of the wallboard member to provide a finished appearance. A supply line connector assembly is securable to the mounting panel through the supply line opening.

The connector assembly comprises a tailpiece, a mounting grommet, a nut, and a retention ring such as a one-way washer. The tailpiece includes an inlet end that is coupleable to a supply line using known coupling methods. A radially extending flange is provided adjacent an opposite outlet end of the tailpiece and includes at least one flat at a circumferential edge thereof. The grommet is disposed on the outlet end of the tailpiece and into abutment with the flange on the tailpiece. An interior surface of the grommet includes a flat that corresponds with the flat on the circumferential edge of the flange. Together the flats restrict relative rotational movements between the grommet and the tailpiece and enable selective alignment between the grommet and tailpiece in at least 180° degree increments although it is understood that additional increments including 90° or 45° increments could be utilized.

The nut is disposed on the outlet end of the tailpiece and is held thereon by the retention ring which is disposed between the nut and the outlet end of the tailpiece. The nut provides a threaded coupling to which a valve and/or distribution line can be coupled to extend the water supply to a fixture, e.g. a washing machine or a faucet.

The supply line opening has a keyhole-style opening into which the grommet is disposed. The grommet includes a raised ridge extending from an otherwise cylindrical outer wall that is receivable into the keyhole-style opening to provide a non-rotatable coupling therebetween. Selective rotational positioning of the grommet relative to the supply line opening may be provided by inclusion of a plurality of recesses in the perimeter of the supply line opening and/or by a plurality of raised ridges on the grommet. The outer wall of the grommet also includes radially expanding flexible tabs that provide a snap-fit engagement with an inwardly extending lip encircling the supply line opening.

Accordingly, the connector assembly can be assembled and coupled to the mounting panel to provide a desired orientation of the inlet and outlet ends of the tailpiece to accommodate any installation configuration. Tailpieces of a variety of configurations can also be provided to adapt the plumbing finish panel assembly to a large variety of existing supply line configurations. The plumbing finish panel assembly is further configurable in a plate or box form.

DESCRIPTION OF THE DRAWINGS

Illustrative embodiments of the invention are described in detail below with reference to the attached drawing figures, and wherein:

FIG. 3 is a plan view of a connector assembly and tailpiece of the supply line connector assembly of FIG. 1;

FIG. 4 is an exploded view of the connector assembly and tailpiece of FIG. 1 and a valve that is coupleable thereto;

FIG. 5 is a perspective view of the connector assembly of FIG. 1;

FIG. 6 is an endview of the connector assembly and tailpiece of FIG. 1;

DETAILED DESCRIPTION

Figure 1:
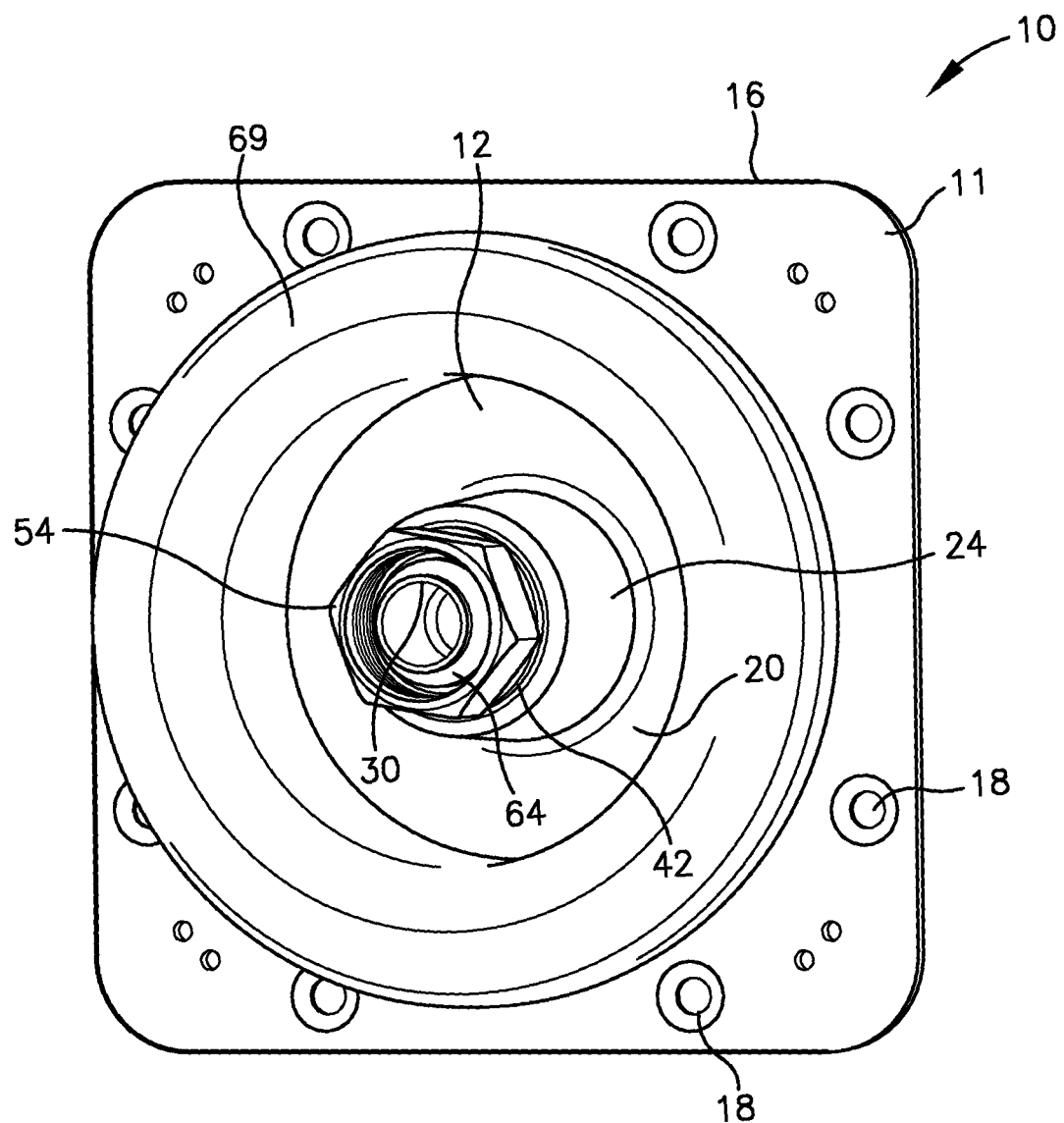
FIG. 1 is a perspective view of a supply line connector assembly depicted in accordance with an embodiment of the invention.
Figure 2:
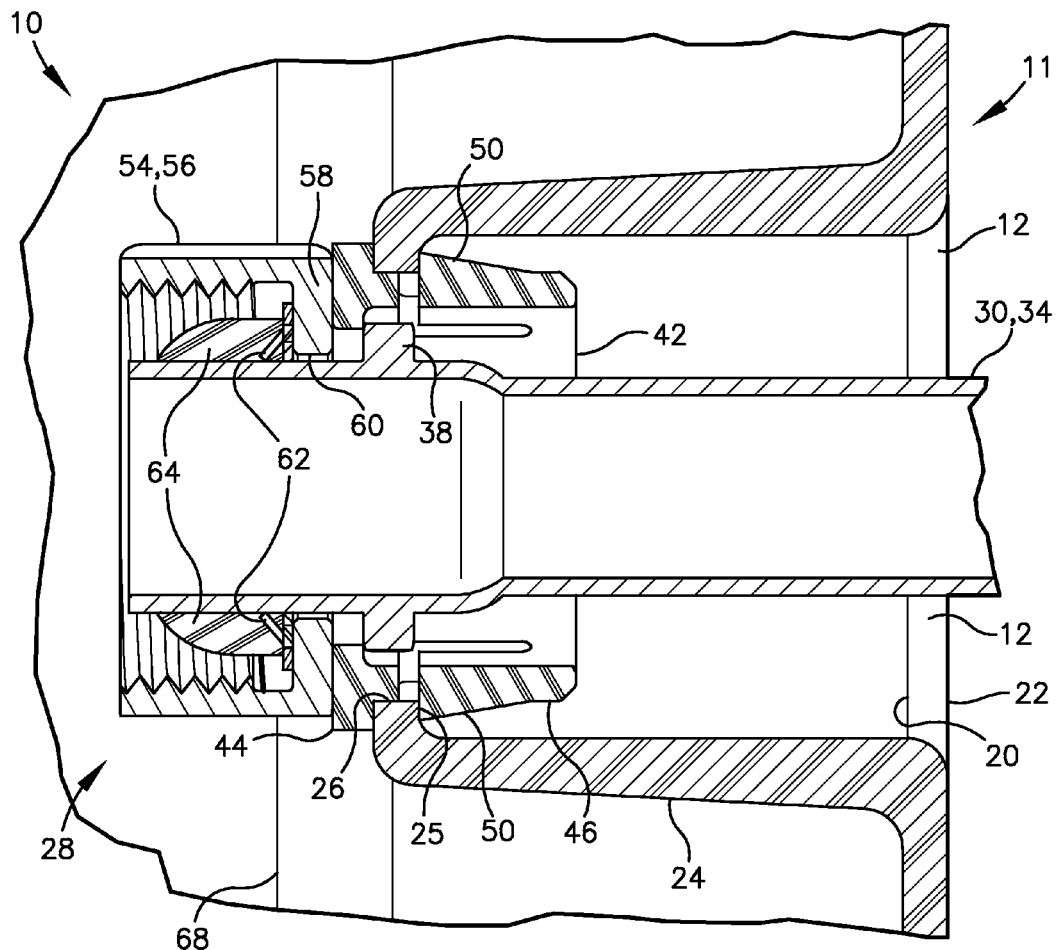
FIG. 2 is a cross-sectional view of the supply line connector assembly of FIG. 1.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

With reference to FIGS. 1-11, the reference numeral 10 refers to a supply line access panel assembly for providing access to a water supply line located in a wall to facilitate connection to a plumbing fixture, such as a toilet or sink. The wall is expected to be constructed in the traditional fashion with wallboard fastened to spaced apart wall studs, including either wood or metal studs. The supply line access panel assembly 10 facilitates connection of a supply line for the toilet to the supply line within the wall. The access panel assembly 10 may also be referred to as a finish panel as it functions to cover a hole formed in the wallboard to permit the above noted connection.

Figure 14:
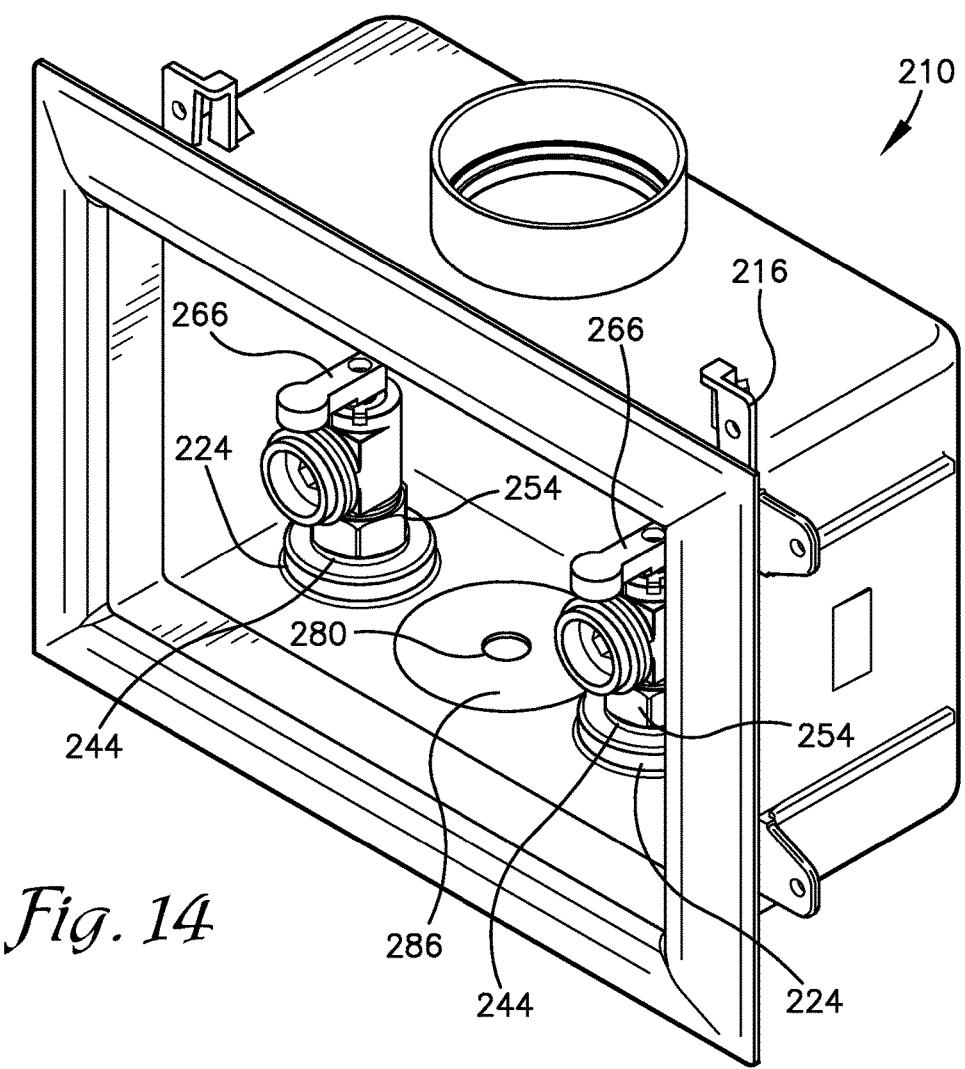
FIG. 14 is a perspective view of a supply and drain line connector assembly configured in a finish box form in accordance with another embodiment of the invention.

Although shown and described herein in a finish plate form in which the components of the assembly are provided on or in a panel oriented substantially parallel to a wallboard in which the assembly is mounted, the assembly 10 may also be employed or configured in a finish box format in which the components thereof are disposed or provided in or by one or more of the faces or walls of the box. For example, as depicted in FIG. 14, an assembly 210 comprises a finish box with a five-face cuboidal form that, when installed in a stud wall, provides a recess in the wall; the components of the assembly 10 may be provided in or by one or more of the walls thereof. It is foreseen that embodiments of the assembly 10 may be configured or adapted for use in place of known plates, boxes, panels, or other forms of finish/mounting/access panel assemblies without departing from the scope of embodiments of the invention described herein.

The assembly 10 includes a mounting panel 11 that is preferably formed from molded, relatively rigid plastic and includes a back panel 12 and a circumferential wall or rim 14 circumscribing and projecting perpendicular and forward from the back panel 12. A mounting flange 16 extends transverse to and circumscribes the circumferential rim 14 in slightly spaced relation forward from the back panel 12, such that a portion of the rim 14 extends rearward from the mounting flange 16 and a portion of the rim 14, having a depth approximately equal to the thickness of conventional wallboard, projects forward from the mounting flange 16. A plurality of fastener receiving holes 18 are formed in the mounting flange 16, through which fasteners may be driven for securing the mounting panel 11 to a stud or other support structure. Although the mounting flange 16 is shown as continuous, it is to be understood that the mounting flange 16 could comprise a plurality of discontinuous mounting flanges projecting outward from or transverse to the rim 14. In the embodiment shown in FIGS. 7-9, the back panel 12 is circular and includes front and rear faces 20 and 22. It is to be understood that the back panel 12 could have a wide variety of geometries depending in part on the intended application.

Figure 15:
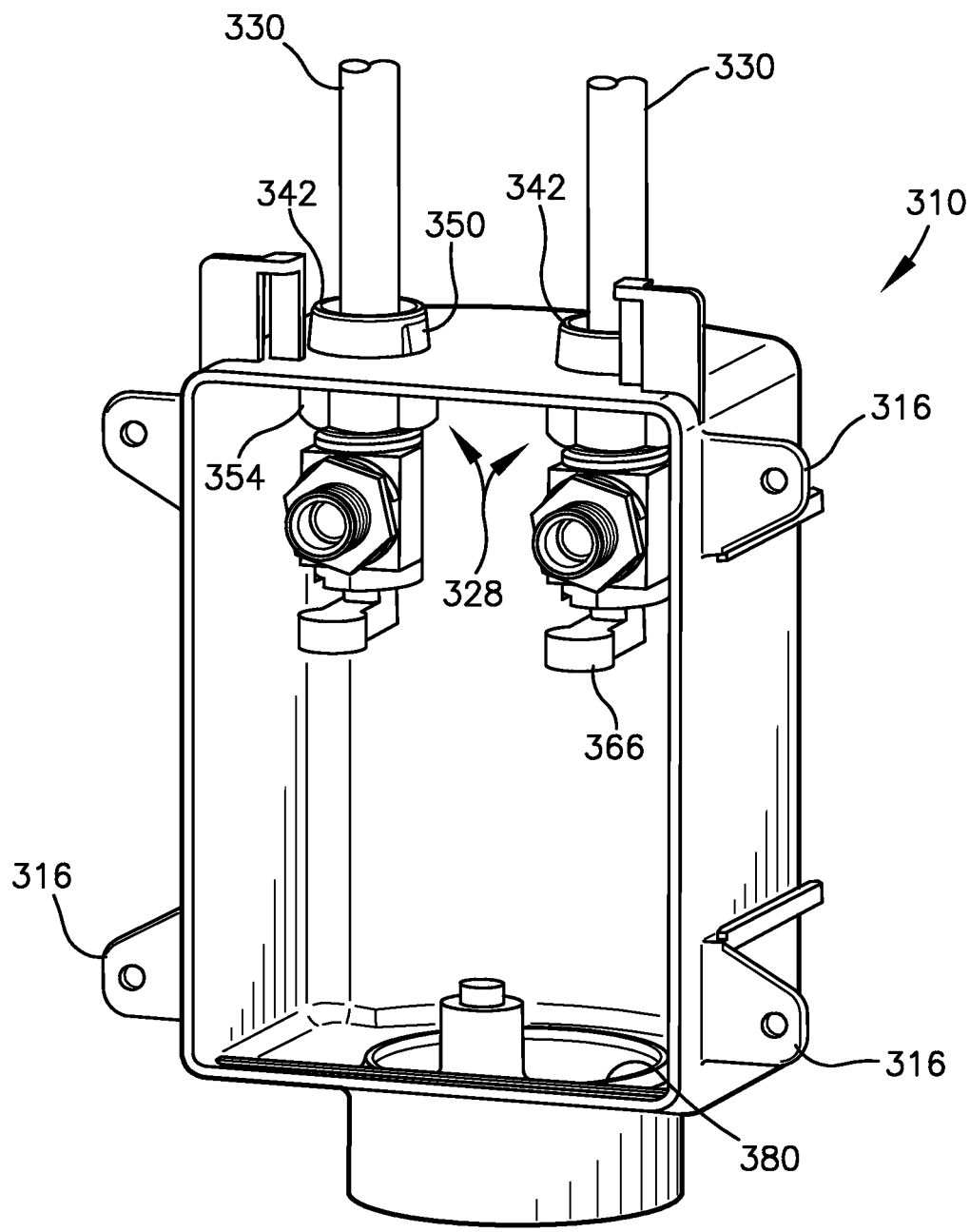
FIG. 15 is a perspective view of a supply and drain line connector assembly configured in another finish box form in accordance with an embodiment of the invention.

A standoff 24 extends from the front face 20 of the back panel 12 a distance generally equal to that of the rim 14 and includes a supply line opening 26 formed therein. In another embodiment, the standoff 24 may extend a greater or lesser distance from the back panel than the rim 14 or the supply line opening 26 may be provided substantially flush with the back panel 12 or in the back panel 12 (for example, FIG. 15 depicts an embodiment in which no standoff is provided). The outer end of the standoff 24 is formed by turning the thin wall of the material forming the back panel 12 inward to form an inwardly directed lip 25 with the opening 26 extending therethrough. A notch or slot 27 is formed in the perimeter of the lip 25 contiguous with the opening 26 to provide a keyhole-style opening.

A supply line connector assembly 28, an example of which is shown in FIGS. 1-4, is securable to the mounting panel 10 through the supply line opening 26. The supply line connector assembly 28 comprises a length of conduit or a tailpiece 30 that may be formed into an elbow having an inlet leg 32 and an outlet leg 34; the tailpiece 30 might alternatively comprise a straight or otherwise bent or curved section of conduit, e.g. pipe or tube. An inlet connector 36 is formed or otherwise connected to or mounted on an inlet end of the inlet leg 32. In the embodiment shown, the tailpiece 30 is formed from copper tube and the inlet connector 36 comprises a ribbed nipple-type connector for connecting flexible PEX conduit thereto. It is foreseen the tailpiece 30 might be constructed from materials other than copper, including PPSU (polyphenylsulfone), or CPVC (chlorinated polyvinyl chloride), among others and that a wide variety of connectors could be used, such as a socket or hub formed by widening the inlet end of the conduit. The connectors may also be configured for a wide variety of coupling techniques including compression fittings, sweating or soldering, brazing, welding, adhesives, threaded couplings, or the like.

A distal end of the outlet leg 34 includes a circumferentially extending ridge or abutment flange 38 surrounding and spaced apart from the tip of the tailpiece 30. The flange 38 includes at least one flat 40 or facet on the circumferential edge.

A grommet 42 is disposed on the distal end of the outlet leg 34. The grommet 42 includes an annulus 44 with an annular wall 46 extending coaxially therefrom. The annulus 44 is dimensioned to receive the distal end of the outlet leg 34 therein but to obstruct passage of the abutment flange 38 therethrough. The annular wall 46 is dimensioned to receive the abutment flange 38 therein and includes at least one flat 48 on an interior surface thereof that can be aligned with the flat 40 on the abutment flange 38. Interaction of the flat 48 with the flat 40 resists relative rotational movement between the tailpiece 30 and the grommet 42.

In one embodiment, the abutment flange 38 and/or the grommet 42 include a plurality of flats 40, 48 to enable selective rotational positioning of the tailpiece 30 relative to the grommet 42. Flats 40, 48 may be provided to enable incremental positioning of the tailpiece 30 at, for example, 30°, 45°, 90°, or 180° increments relative to the grommet 42. In another embodiment, the flat 40 and/or the flat 48 is omitted; such a configuration may be employed in an application in which rotation of the tailpiece 30 relative to the grommet 42 is desirable. It is understood that other features including, for example, notches, tabs, slots, or the like, may be employed in place of the flats 40, 48 to provide a substantially similar function; such alternatives are within the scope of embodiments of the invention described herein.

The annular wall 46 of the grommet 42 includes a pair of flexible tabs 50 formed integral therewith to extend generally parallel to the annular wall 46 but also to extend a distance radially outward therefrom. The flexible tabs 50 can be flexed radially inward to enable insertion of the annular wall 46 into the supply line opening 26 of the mounting panel 11 and past the inwardly turned lip 25. Upon passage of the distal ends of the tabs 50 past the lip 25, the tabs 50 flexibly return to their normal position behind the lip 25 and thereby obstruct withdrawal of the grommet 42 from the opening 26.

As shown in FIG. 5, a longitudinal ridge 52 is provided on an exterior face of the annular wall 46 and extends parallel to the axis of the annular wall 46. The ridge 52 is configured to be received by the slot 27 in the lip 25 adjacent the supply line opening 26 to thereby restrict rotational movement of the grommet 42 relative to the mounting panel 11.

Figure 9:
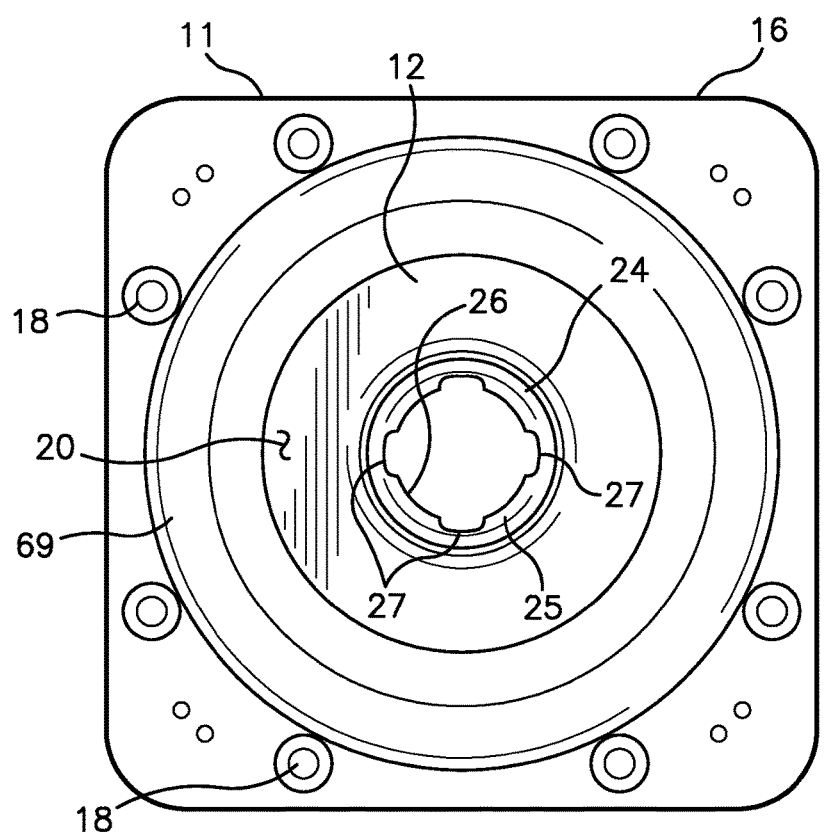
FIG. 9 is a front elevational view of a mounting panel and finish collar with a plurality of recesses provided in the perimeter of a supply line opening depicted in accordance with another embodiment of the invention.
Figure 10:
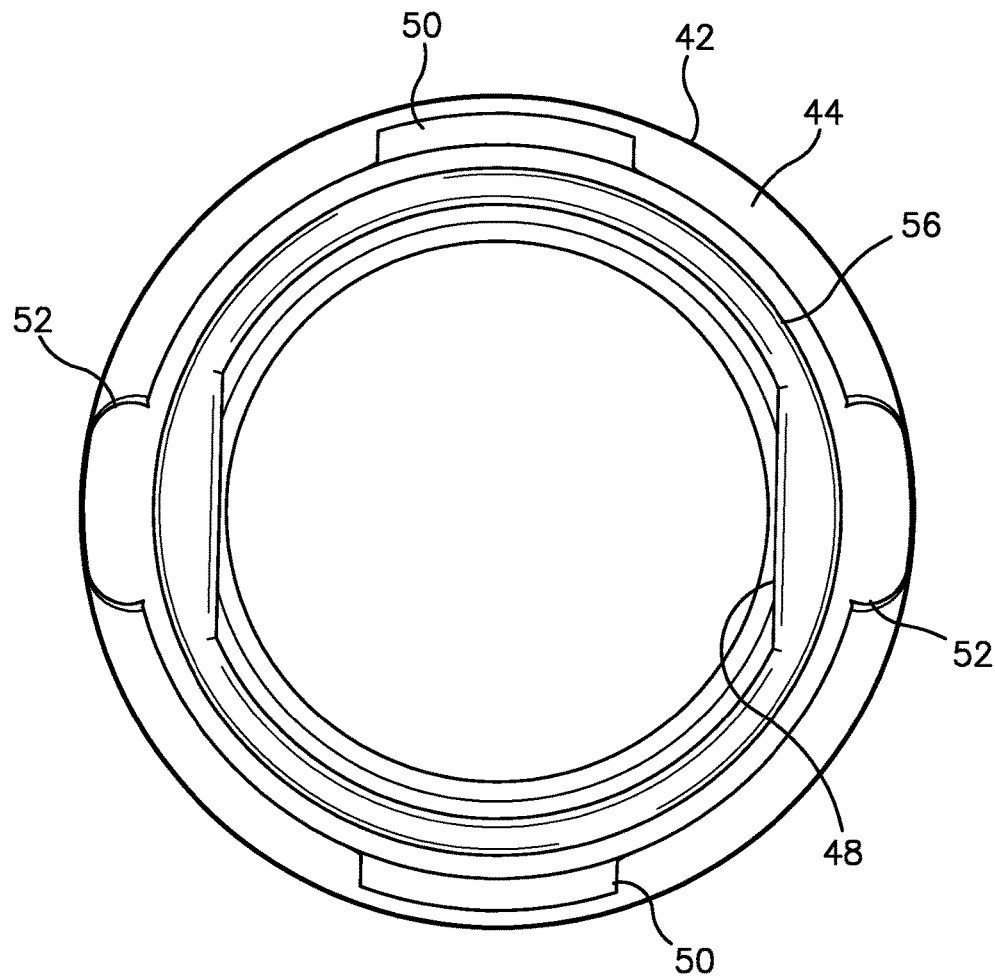
FIG. 10 is a axial view of a grommet of a supply line connector assembly with a plurality of longitudinal ridges disposed about the perimeter of an annular wall thereof depicted in accordance with an embodiment of the invention.

In one embodiment, more than one slot 27 and/or more than one ridge 52 is provided by the supply line opening 26 and the grommet 42, respectively as shown in FIGS. 9 and 10. As such, the ridge(s) 52 on the grommet 42 may be selectively aligned with the slot(s) 27 to provide a desired rotational orientation of the grommet 42 relative to the supply line opening 26. The rotational orientation of the tailpiece 30 relative to the supply line opening 26 and to the mounting panel 11 may thus also be selected via the orientation of the grommet 42.

The supply line connector assembly 28 further comprises a nut 54 having a circumferential wall 56 with a faceted outer surface and a threaded inner surface similar to, for example, a common hex-nut. In another embodiment, the nut 54 may include knurling or other surface features that enable rotation thereof by hand or by one or more hand tools. The nut 54 also includes a shoulder or an endwall 58 positioned at one end thereof and extending radially inward to form an opening 60 that is dimensioned just large enough to receive the distal end of the outlet leg 34 therethrough in close proximity to the circumferential edge of the opening 60. The nut 54 is installed on the outlet leg 34 to place the endwall 58 into abutment with or closely adjacent to the annulus 44 of the grommet 42. The abutment flange 38 is preferably spaced from the tip of the tailpiece 30 a distance less than or equal to the total axial length of the annulus 44 and the nut 54 combined such that the tailpiece 30 does not substantially protrude beyond a distal edge of the nut 54.

A retention ring 62 is disposed on the outlet leg 34 and positioned interior to the circumferential wall 56 of the nut 54 to retain the nut 54 and the grommet 42 in their installed positions on the tailpiece 30. The retention ring 62 may comprise a one-way washer, clip, or similar component that is configured for sliding movement along the tailpiece 30 in one direction but resists movement in the opposite direction. In one embodiment, the retention ring 62 may be installed in a desired position on the tailpiece 30 without sliding or may be formed integral to the tailpiece 30. In the embodiment shown, the retention ring 62 includes a plurality of gripping fingers angled to allow sliding in a first direction but which dig into the tailpiece 30 when urged in the opposite direction. In the installed position, the retention ring 62 is preferably located near or in close proximity to the interior face of the endwall 58 and allows the nut 54 to rotate relative to the tailpiece 30 but restricts movement of the nut 54 in an axial direction.

An elastomeric sealing member 64 may be integrated with the retention ring 62 or may be installed on the outlet leg 34 following the retention ring 62 to aid in forming a seal between the supply line connector assembly 28 and a valve 66, hose, or other fitting coupled thereto. In another embodiment, the elastomeric sealing member 64 may also function as the retention member 62 by providing sufficient resistance to sliding movement of the nut 54 and the grommet 42 toward the distal end of the outlet leg 34, such as via frictional engagement between the sealing member 64 and the exterior surface of the tailpiece 30.

As depicted in FIG. 4, the valve 66 comprises a quarter turn, shut-off valve that can be coupled to the supply line connector assembly 28 and form a watertight seal without the use of tools. In the embodiment shown, the valve 66 includes an exteriorly threaded female receiver 68 on an inlet of the valve 66. The outlet of the valve 66 can be adapted to facilitate quick connection of a water supply line, such as a hot or cold supply line installed between the valve 66 and a fixture, such as a sink, and may comprise a compression fitting which can be tightened by hand to form a water tight seal. It is understood that other valves 66, fittings, and fixtures can be coupled to the supply line connector assembly 28 without departing from the scope of embodiments described herein. Rotation of the nut 54 relative to the tailpiece 30 enables the valve 66 to be installed and/or rotated in any desired rotational orientation relative to the tailpiece 30 both during installation and following installation.

The connector assembly 28 is preferably sized for coupling with the inlet receiver of a standard-sized valve 66 with a portion of the distal end of the outlet leg 34 of the tailpiece 30 and the sealing member 64 extending into the receiver and the sealing member 64 abutting against an outer edge of the receiver. The nut 54 can be hand tightened onto the external thread of the valve inlet receiver to compress the sealing member 64 between the endwall 58 of the nut 54 and against the outer edge of the receiver to form a water tight seal therebetween. It is foreseen that a wide variety of sealing type systems could be used for forming a seal between the supply line connector assembly 28 and the valve inlet receiver. For example, the sealing member 64 could be an O-ring secured in a groove on the nut 54 or tailpiece 30 and sized to snugly fit within the receiver to form a water tight seal around an inner surface thereof.

In use, a plumber or installer can mount the mounting panel 11, make connections between the supply line connector assembly 28 and supply lines, and orient the connector assembly 28 within the mounting panel 11 in various sequences. For example, the installer can make the plumbing connections prior to mounting the mounting panel 11 or vice-versa; all such orders of installation or sequences are within the scope of embodiments of the invention described herein. In some embodiments, the assembly 10 may be provided to the plumber/installer in a fully or partially assembled condition. Or the assembly 10 may be provided unassembled to allow the plumber/installer to tailor the assembly configuration to the needs of a particular installation.

The mounting panel 11 can be installed by mounting to studs or brackets selected from a wide variety of existing types of brackets secured between studs to support the mounting panel 11 at a position associated with a hot or cold water supply line for connection thereto. When the supply line connector assembly 28 is pre-installed in the mounting panel 11 before mounting to the studs or brackets, the mounting panel 11 can be oriented as desired to direct the inlet leg 32 of the tailpiece 30 in a desired direction for coupling to the supply line.

The water supply line is coupled to the inlet leg 32 of the tailpiece 30 using a desired coupling method. For example, as depicted in FIGS. 1-11, the supply line access panel assembly 10 is configured for use with PEX water supply lines; the water supply line would thus be coupled to the inlet leg using known methods for coupling with PEX lines, such as compression or crimped fittings. The supply line can be coupled to the tailpiece 30 prior to or after installation of the mounting panel and/or installation of the supply line connector assembly 28 in the mounting panel.

The supply line connector assembly 28 may be supplied in an assembled condition in which the grommet 42, nut 54, retention ring 62, and sealing member 64 are preinstalled on the tailpiece 30 or may be supplied unassembled. In the assembled condition, the assembly 28 is installed in the mounting panel 11 by inserting the inlet end of the tailpiece 30 through the supply line opening 26 and aligning the ridge 52 of the grommet 42 with the slot 27. The circumferential wall 56 of the grommet 42 is inserted through the opening 26 until the flexible tabs 50 pass past the lip 25 around the opening 26 and flex radially outwardly behind the lip 25 to obstruct withdrawal of the grommet 42 from the opening 26. The tailpiece 30 is thereby held in position and restricted against rotational motion relative to the mounting panel 11 by interaction of the ridge 52 and the slot 27 and by interaction of the flat 40 on the abutment flange 38 and the flat 48 on the grommet 42.

The grommet 42 may be provided with a plurality of ridges 52 and/or the lip 25 surrounding the supply line opening 26 may be provided with a plurality of slots 27 to enable selective positioning of the grommet 42 and thus the tailpiece 30 relative to the mounting panel 11, e.g. the grommet 42 may be received in the supply line opening 26 in one of a plurality of rotational alignments defined by the slots 27 and/or the ridges 52.

In the unassembled condition, the abutment flange 38 and/or the grommet 42 may be configured to enable selective rotational orientation therebetween. A plurality of the flats 40 may be provided on the abutment flange 38 and/or a plurality of the flats 48 may be provided on the interior of the circumferential wall 56 of the grommet 42 to enable selective rotational alignment between the tailpiece 30 and the grommet 42. Upon selection of a desired alignment, the grommet 42 is installed on the outlet leg 34 of the tailpiece 30 with the abutment flange 38 being received within the circumferential wall 56 and against the annulus 44.

The nut 54 is installed on the outlet leg 34 to abut the endwall 58 thereof against the annulus 44 of the grommet 42. The retention ring 62 and the sealing member 64 are then installed on the outlet leg 34 and received within the nut 54. The retention ring 62 thus operates to retain the nut 54 and the grommet 42 in their installed locations on the outlet leg 34. The assembled supply line connector assembly 28 can then be installed in the mounting panel 11 as described above. Or the assembly 28 can be coupled to the supply line and then installed in the mounting panel 11.

After installation of the supply line connector assembly 28 in the mounting panel 11 and installation of the mounting panel 11 in the stud wall, wall board 67, drywall, or other paneling or construction material (referred to generally herein as wall board 67) may be installed on the stud wall. The installer of the wall board 67 cuts a hole in the wall board 67 just larger than the rim 14 of the mounting panel 11 and aligned therewith to enable the rim 14 to extend through the installed wall board 67, as shown in FIG. 11.

Figure 11:
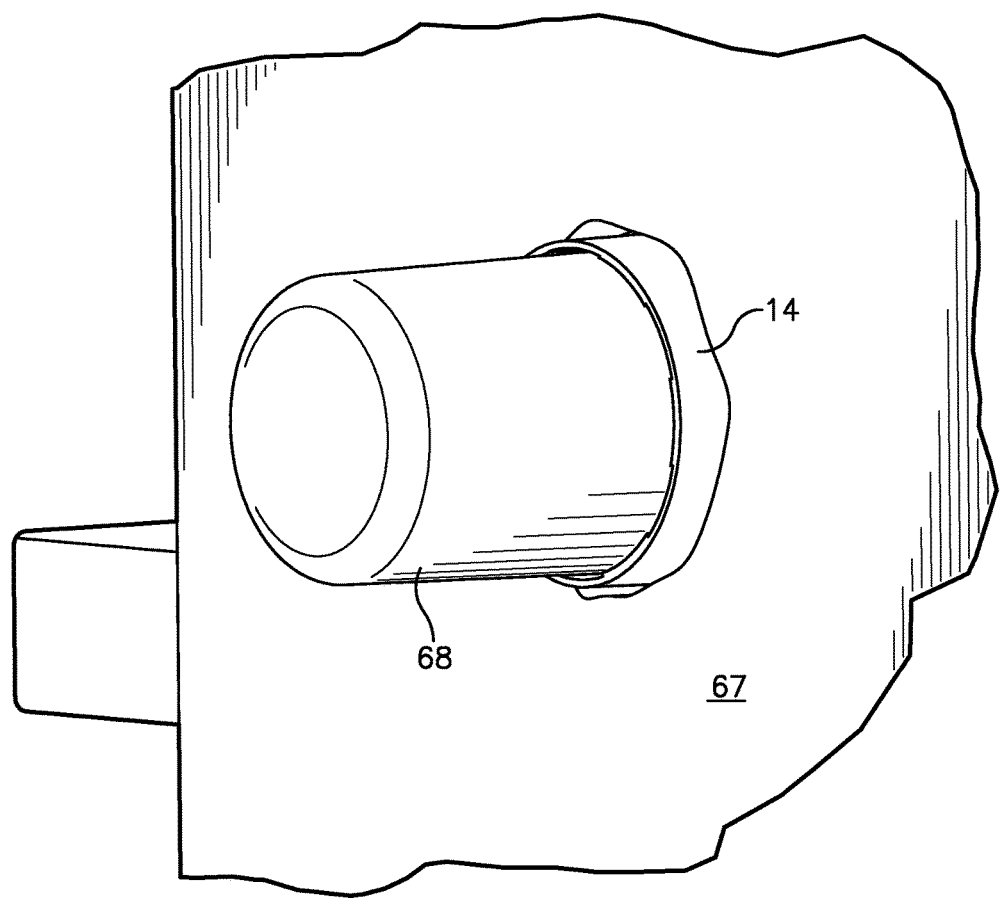
FIG. 11 is a perspective view of the mounting panel of FIG. 7 installed in a wall board and with a protective cover installed thereon.

A protective cap or cover 68 may be installed on the mounting panel 11 by coupling to the rim 14 as depicted in FIG. 11. The cover 68 may include threads, ribs, or other features configured to provide a removable coupling with the mounting panel 11 or rim 14 thereof. Upon completion of various construction activities, the cover 68 can be removed and a finish ring 69 installed on the mounting panel 11 by coupling to the rim 14.

Figure 7:
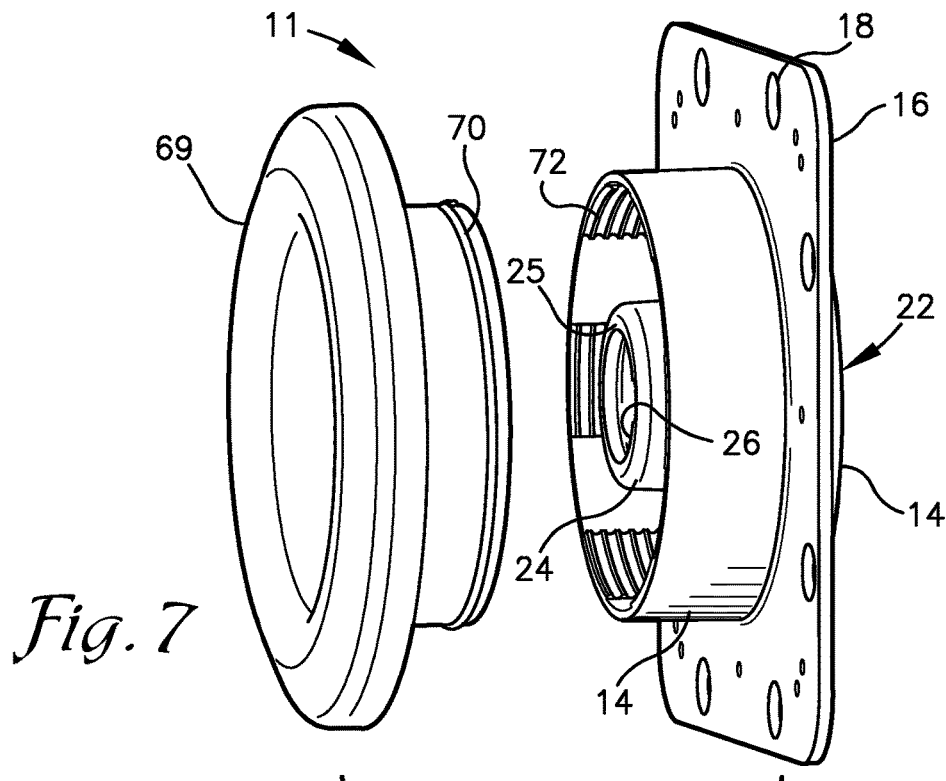
FIG. 7 is an exploded view of a mounting panel and finish collar of the supply line connector assembly of FIG. 1.
Figure 8:
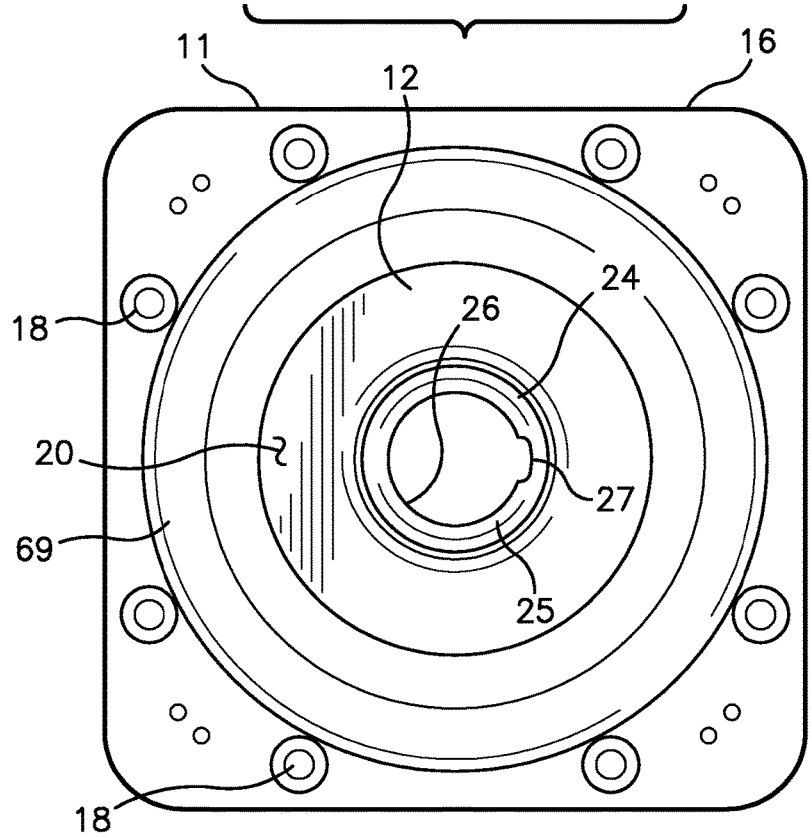
FIG. 8 is a front elevational view of the mounting panel and finish collar of FIG. 7.

The finish ring 69 provides a finished look to the installation by covering any gap between the rim 14 and the wall board 67. As depicted in FIG. 7, the finish ring 69 includes an exterior threaded portion 70 that is configured for receipt within the rim 14 which includes a corresponding interior threaded portion 72. A variety of other coupling configurations may be employed and are within the scope of embodiments of the invention described herein. For example, the finish ring 69 can include a flexible toothed flange and the rim 14 can include a plurality of circumferential ridges or ratchet strips that are engageable by the toothed flange. In addition, the finish ring 69 may be of a variety of geometries to match the geometry of the rim 14, including rectangular.

The valve 66 or other fittings can be coupled to the supply line connector assembly 28 to couple fixtures, such as a faucet, toilet, or the like, to the supply line. If after installation, the valve 66 fails, it is relatively easy to remove and replace as the nut 54 connecting the supply line connector assembly 28 to the valve inlet receiver is adapted for hand tightening.

Figure 12:
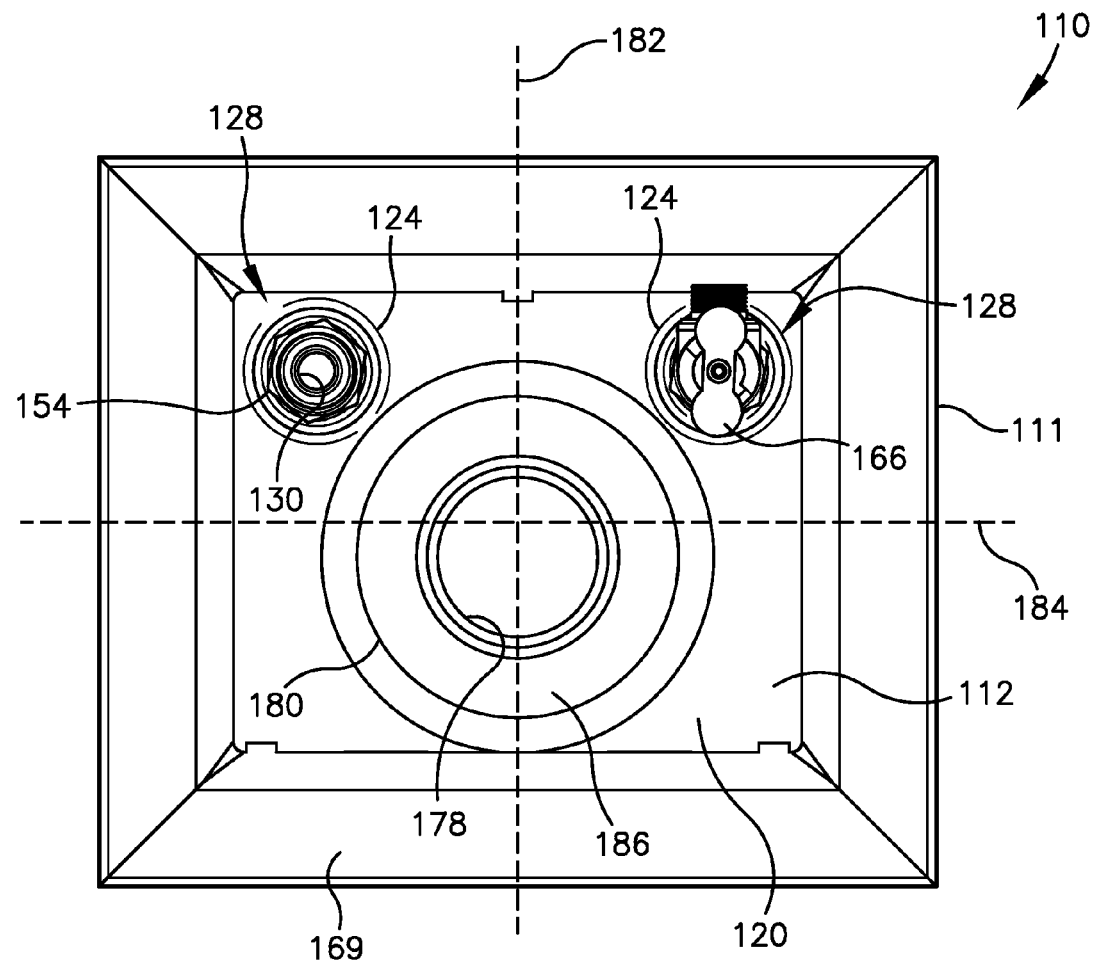
FIG. 12 is a front elevational view of a supply and drain line connector assembly with a valve installed on one supply line connector assembly depicted in accordance with another embodiment of the invention.
Figure 13:
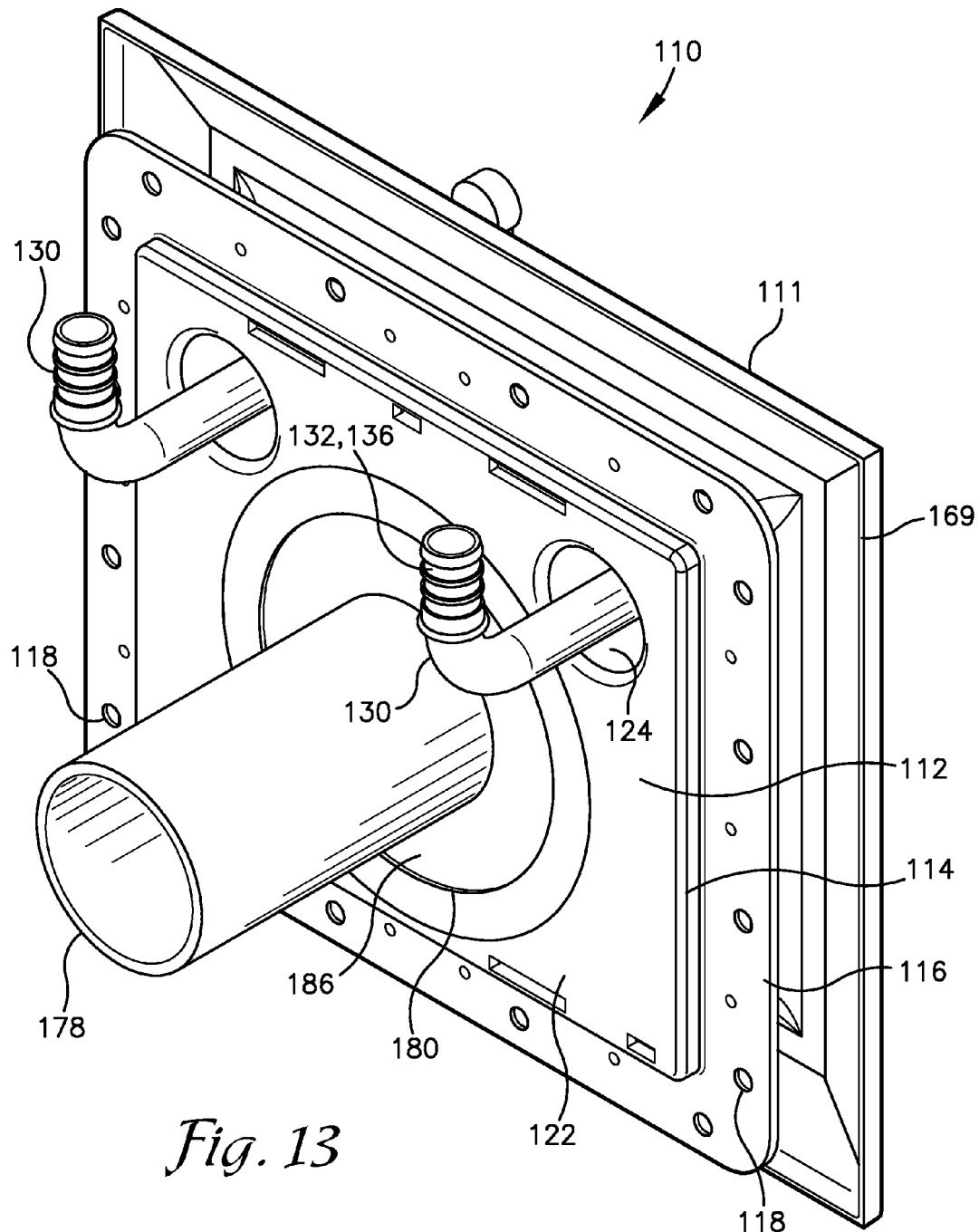
FIG. 13 is a backside perspective view of the supply line connector assembly of FIG. 10.

With reference now to FIGS. 12 and 13, a supply line access panel assembly 110 is described in accordance with another embodiment of the invention. The assembly 110 includes features similar to those of the assembly 10 described above. The similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate the features or elements are necessarily the same.

The assembly 110 comprises a supply and drain line mounting panel 111 for providing access to hot and cold water supply lines and to a drain line 178 located in a wall to facilitate connection to a plumbing fixture such as a washing machine (not shown). The mounting panel 111, which is preferably formed from molded, relatively rigid plastic, includes the back panel 112, and a circumferential wall or rim 114 circumscribing and projecting perpendicular and forward from the back panel 112. A mounting flange 116 extends transverse to and circumscribes the circumferential rim 114 in slightly spaced relation forward from the back panel 12, such that a portion of the rim 114 extends rearward from the mounting flange 116 and a portion of the rim 114, having a depth approximately equal to the thickness of conventional wallboard, projects forward from the mounting flange 116. A plurality of fastener receiving holes 118 are formed in the mounting flange 116, through which fasteners may be driven for securing the finish panel 111 to a stud or other support structure such as a bracket coupled between adjacent studs or extending from a single stud, among other configurations. Although the mounting flange 116 is shown as continuous, it is to be understood that the mounting flange 116 could comprise a plurality of discontinuous mounting flanges projecting outward from or transverse to the rim 114. For example, FIGS. 14 and 15 depict exemplary assemblies 210 and 310 with cuboidal forms in accordance with other embodiments of the invention; the assemblies 210, 310 include a plurality of discontinuous flanges 216, 316.

The back panel 112 is preferably rectangular and includes front and rear faces 120 and 122. A first centerline 182 extends between first and second sides of the back panel 112 and a second centerline 184 extends between third and fourth sides of the back panel 112.

A pair of supply line openings 126 and a drain line opening 180 are formed in and extend through the back panel 112. An annular, elastomeric seal 186 is over-molded onto or otherwise secured to the back panel 112 over and around the drain line opening 180. The seal 186 includes a central opening or aperture that is smaller than the drain line opening 180. An edge of the back panel 112 surrounding the drain line opening 180 preferably includes molded in surface anomalies, such as ridges, grooves, indentations, openings and the like to improve adherence of the over-molded elastomeric material to the plastic back panel 112. In another embodiment depicted in FIG. 15, the assembly 310 may not include the elastomeric seal; the assembly 310 may be configured with a drain line opening 380 having a configuration similar to those available in the art, e.g. including threaded or bayonet-style couplings, knockouts, or may omit the drain line opening 380 altogether.

In an exemplary embodiment, the drain line opening 180 is approximately three and one half inches in diameter and the central opening of the seal 186 is approximately two and one half inches in diameter. The drain line opening 180 preferably is centered on the first centerline 182 between first and second sides of the back panel 112 and offset toward one of the third or fourth sides of the back panel 112. The supply line openings 126 are spaced apart on opposite sides of the first centerline 182 with both positioned on one side of the second centerline 184, on the side opposite the drain line opening 180.

Standoffs 124 are formed in and extend forward from the back panel 12 and include the supply line openings 126 within the terminal end thereof defined by an inwardly turned lip 125 of the standoff 124. A supply line connector assembly 128 is securable to said mounting panel 111 through each of the supply line openings 126.

Prior to connection of the fixture drain pipe to the drain line 178 in the wall, the mounting panel 111, with the supply line connector assemblies 126 mounted thereon may be set in place over the drain line 178, e.g. a stub out, or a trap adaptor coupled thereto. The drain line opening 180 in mounting panel 111 is aligned with trap adaptor and then the mounting panel 111 is pushed rearward over the trap adaptor. The drain line opening 180 in mounting panel 111 is preferably sized larger than a cap on the trap adaptor to slide over the cap although it is foreseen that the installer may remove the cap to facilitate pushing the mounting panel 111 onto the stub out. The drain line opening 180 is also sized larger than the hub of a tee or other plumbing fitting on the drain line stub out 178 so that the hub may extend through the opening 180.

After the mounting panel 111 is pushed over the trap adaptor stub out, brackets may then be bolted or otherwise connected to the mounting flange 116 on the mounting panel 111 and connected to studs in the wall to secure the mounting panel 111 in place in a desired orientation to facilitate connection of the supply lines to the supply line connector assemblies 126 mounted in the mounting panel 111. The mounting panel 111 may be secured to the brackets or studs with fasteners extending through selected fastener holes 118 in the mounting flange 116 aligned with holes in the brackets. The drain line opening 180 is sized to permit the mounting panel 111 to be slid onto a drain line stub out 178 extending at an angle of roughly forty-five degrees relative to the wall. It is also to be understood that one or more sides of the mounting flange 116 could be fastened to studs or other framing members with nails screws or other fasteners.

The supply lines typically will be plumbed to come into the stud bay above the drain line tee and then extend downward on either side of the drain line 178. In such an installation, the mounting panel 111 will typically be oriented with the supply line openings 126 extending above the drain line opening 180. The connector assemblies 126 are then oriented so that the inlet legs 132 of the tailpieces 130 extend upward for receiving and connecting to the downwardly extending supply lines.

If for any reason it is more convenient to plumb one of the supply lines to approach the mounting panel 111 at a forty five degree angle, the supply line connector assembly 128 to which the angled supply line is to be attached can be oriented as discussed above so that the inlet leg 132 of the tailpiece 130 extends at a forty five degree angle relative to vertical or horizontal. If the installation favors extending the supply lines from below, the mounting panel 111 can be mounted with the supply line openings 126 positioned below the drain line opening 180 and the supply line connector assemblies 128 oriented so that the inlet legs 132 extend downward for receiving the upwardly extending supply lines. Similarly, if the installation favors plumbing the supply lines to approach the mounting panel 111 from either side, the mounting panel 111 can be oriented so that the supply line openings 126 are positioned to one side of the drain line opening 180 and the supply line connector assemblies 128 could be oriented with the inlet legs 132 extending to the side or offset forty-five degrees from horizontal. If the installation favors plumbing one of the supply lines from above and the other supply line from below, the supply line connector assemblies 128 can be oriented with the inlet leg 132 of one extending upward and the inlet leg 132 of the other extending downward. It is also foreseen that if desired, the mounting panel 111 could be mounted at any angle relative to the plane of the wall.

The drain line opening 180 and over-molded drain line seal 186 is sized large enough to accommodate not just the branch of the drain line 178 to connect to the fixture, but also the hub of a drain line tee from which the branch extends. This flexibility is important as in some cases the drain line 178 may be plumbed such that the hub of the tee is positioned so that it will extend through the wall. The drain line opening 180 and the over-molded seal 186 are also sized large enough to accommodate drain line branches extending through the wall at forty five degrees to connect to offset lavatory sinks which are not uncommon, particularly in selected jurisdictions.

The finish ring 169 is adapted to cover the gap between the rim 114 of the mounting panel 111 and the wall board to present a clean looking finish around the edges of the assembly 110.

The flexible elastomeric seal 186 surrounding the trap adaptor stub-out or the drain tee hub forms a seal therearound to prevent water from migrating along the outside of the stub out 178 and behind the wall board. The seal 186 also presents a relatively clean appearance covering the gap between the trap adaptor stub out 178 and the drain line opening 180 in the mounting panel 111. The seal 186 also reduces the ability of pests or vermin to enter the room through such a gap.

The assemblies 10 and 110 also improve on other aspects of known systems. Known systems, such as a laundry water and drain line hook-up box, typically secure a valve or other fitting to a mounting panel using a threaded nut. The fitting includes a shoulder disposed along its length and a threaded shank extending from the shoulder toward an input end of the fitting. The shank is disposed through an aperture in the mounting panel and a nut installed on the shank. The nut is tightened against one side of the mounting panel and draws the shoulder into contact with the opposite side of the mounting panel. The fitting is thus secured to the mounting panel by compression or capturing of the mounting panel between the shoulder and the nut. Wallboard is then installed leaving the mounting panel and fitting exposed but concealing the nut and the connection of the fitting to the water supply line inside the wall. During use, it is common for the fitting to be rotated purposefully or inadvertently relative to the mounting panel. This can result in loosening of the nut due to frictional engagement of the nut with the surface of the mounting panel and in turn results in loosening of the securement of the fitting to the mounting panel. Tightening of the nut to re-secure the fitting is not possible or is very difficult to complete without damaging the wallboard to gain access to the nut.

Embodiments of the invention described herein eliminate the nut and the potential for loose securement of the fitting to the mounting panel. And at least partial rotation of fittings or valves 66 coupled to the assembly 10, 110 is allowed by the rotatable configuration of the nut 54 on the tailpiece 30 which enables repositioning of the valve 66 relative to the mounting panel 11 without detriment to the remainder of the assembly 10, 110.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A plumbing finish panel assembly for covering an opening in a wall panel through which a water supply line extends, the finish panel assembly comprising:
   a mounting panel having a supply line opening formed therethrough; and
   a supply line connector assembly securable in the supply line opening of the mounting panel, the supply line connector assembly including:
   a tailpiece with an inlet end and an outlet end, the inlet end including an inlet supply line connector that is coupleable to a supply line,
   a radially extending abutment flange on the tailpiece and spaced from the outlet end, the abutment flange including a first flat on a circumferential face thereof, and a grommet comprising an annulus with a circumferential wall extending coaxially therefrom, an inner surface of the circumferential wall including a second flat, the circumferential wall receiving the abutment flange therein with the first flat in alignment with the second flat, and the circumferential wall being dimensioned for receipt in the supply line opening, the engagement of the first flat and the second flat resisting rotation of the tailpiece relative to the grommet.

2. The plumbing finish panel assembly of claim 1, further comprising:
a standoff projecting from the mounting panel and having the supply line opening at a distal end thereof.

3. The plumbing finish panel assembly of claim 1, wherein the supply line opening is circumscribed by an inwardly turned lip of the standoff, a recess is formed in the inwardly turned lip and contiguous with the supply line opening and an outer surface of the circumferential wall of the grommet includes a longitudinally extending raised ridge, and wherein the ridge is receivable within the recess such that the interaction between the ridge and the recess resists rotation of the grommet relative to the mounting panel.

4. The plumbing finish panel assembly of claim 1, further comprising:
a nut disposed between the grommet and the outlet end of the tailpiece, the nut including an endwall positioned adjacent or into abutment with the annulus of the grommet.

5. The plumbing finish panel assembly of claim 4, further comprising:
a retention ring disposed on the tailpiece between the nut and the outlet end, the retention ring resisting movement of the nut and grommet toward the outlet end.

6. The plumbing finish panel assembly of claim 4, wherein the nut includes a threaded interior face that is coupleable to a plumbing fitting.

7. The plumbing finish panel assembly of claim 6, wherein the plumbing fitting is associated with one or more of a valve and a hose.

8. The plumbing finish panel assembly of claim 4, further comprising:
a sealing member disposed between the nut and the outlet end of the tailpiece that aids formation of a water tight seal between two or more of the nut, the tailpiece, and a plumbing fitting coupled to the nut.

9. The plumbing finish panel assembly of claim 1, wherein the mounting panel includes a second supply line opening and a drain line opening, the drain line opening including a resilient seal projecting radially inward from the perimeter of the drain line opening, and the second supply line opening is configured similarly to the supply line opening.

10. The plumbing finish panel assembly of claim 1, wherein the finish panel assembly is configured as a plumbing finish panel and wherein the mounting panel is configured to lie substantially parallel to the wall panel, the assembly further comprising:
a circumferential sidewall extending around a periphery of the mounting panel and projecting forward therefrom; and
a mounting flange projecting outward and transverse to the circumferential sidewall such that a portion of the circumferential sidewall extends forward from the mounting flange a distance at least as deep as the thickness of conventional wallboard.

11. The plumbing finish panel assembly of claim 10, wherein the mounting flange enables mounting of the plumbing finish panel assembly to a stud or to a bracket.

12. The plumbing finish panel assembly of claim 1, wherein the plumbing finish panel is configured as a plumbing finish box and the mounting panel comprises one or more faces of the plumbing finish box.

13. A plumbing finish panel assembly for covering an opening in a wall panel through which a water supply line extends, the finish panel assembly comprising:
a mounting panel having a supply line opening formed therethrough; and
a supply line connector assembly securable in the supply line opening of the mounting panel, the supply line connector assembly including:
a tailpiece with an inlet end and an outlet end, the inlet end including an inlet supply line connector that is coupleable to a supply line,
a radially extending abutment flange formed integral with the tailpiece and spaced from the outlet end,
a grommet comprising an annulus with a circumferential wall extending coaxially therefrom, the circumferential wall receiving the abutment flange therein, and being insertable in the supply line opening,
means for fixing the tailpiece in a rotational orientation relative to the mounting panel, and
a nut having an endwall with an opening therethrough, the opening being dimensioned to receive the outlet end of the tailpiece therethrough, the nut being disposed between the annulus of the grommet and the outlet end of the tailpiece.

14. The plumbing finish panel assembly of claim 13, further comprising:
a retention ring disposed between the endwall of the nut and the outlet end of the tailpiece to retain the nut and grommet on the tailpiece.

15. The plumbing finish panel assembly of claim 13, further comprising:
a standoff projecting from the mounting panel and having the supply line opening at a distal end thereof; and
an inwardly turned lip circumscribing the supply line opening.

16. The plumbing finish panel assembly of claim 13, wherein the means for fixing the tailpiece in a rotational orientation relative to the mounting panel includes a recess formed in and contiguous with the perimeter of the supply line opening, and a longitudinally extending raised ridge on an outer surface of the circumferential wall of the grommet, and wherein the ridge is receivable within the recess such that the interaction between the ridge and the recess resists rotation of the grommet relative to the mounting panel.

17. The plumbing finish panel assembly of claim 16, wherein the recess comprises one of a plurality of recesses contiguous with the perimeter of the supply line opening, the raised ridge comprises one of a plurality of raised ridges on the outer surface of the circumferential wall of the grommet and the plurality of recesses and the plurality of raised ridges provide a plurality of selectable rotational orientations of the grommet relative to the supply line opening.

18. The plumbing finish panel assembly of claim 13, wherein the means for fixing the tailpiece in a rotational orientation relative to the mounting panel further comprises:
a first flat on a circumferential face of the abutment flange on the tailpiece;
a second flat on an inner surface of the circumferential wall of the grommet, wherein the first flat is aligned with the second flat, and the interaction of the first flat and the second flat resists rotation of the tailpiece relative to the grommet.

19. The plumbing finish panel of claim 18, wherein a plurality of rotational orientations of the tailpiece relative to the grommet are provided by one or more of a plurality of first flats on the abutment flange and a plurality of second flats on the circumferential wall of the grommet.

20. The plumbing finish panel assembly of claim 19, wherein the rotational orientations are provided in one of 30°, 45°, 90°, or 180° increments.

21. The plumbing finish panel assembly of claim 13, further comprising:
a sealing member disposed between the nut and the outlet end of the tailpiece that aids formation of a water tight seal between two or more of the nut, the tailpiece, and a plumbing fitting coupled to the nut.

22. The plumbing finish panel assembly of claim 13, further comprising:
a circumferential sidewall extending around a periphery of the mounting panel and projecting forward therefrom;
a mounting flange projecting outward and transverse to the circumferential sidewall such that a portion of the circumferential sidewall extends forward from the mounting flange a distance at least as deep as the thickness of conventional wallboard; and
a finish ring that is coupleable to the circumferential sidewall to extend over a space formed between the circumferential sidewall and a wallboard behind which the mounting panel is disposed.

23. A plumbing finish panel assembly for covering an opening in a wall panel through which a water supply line extends, the finish panel assembly comprising:
a mounting panel having a pair of supply line openings and a drain line opening formed therethrough; and
a pair of supply line connector assemblies, each connector assembly securable in a respective one of the supply line openings of the mounting panel, each supply line connector assembly including:
a tailpiece with an inlet end and an outlet end, the inlet end including an inlet supply line connector that is coupleable to a supply line,
a radially extending abutment flange on the tailpiece and spaced from the outlet end, the abutment flange including a first flat on a circumferential face thereof, and
a grommet comprising an annulus with a circumferential wall extending coaxially therefrom, an inner surface of the circumferential wall including a second flat, the circumferential wall receiving the abutment flange therein with the first flat in alignment with the second flat, and the circumferential wall being dimensioned for receipt in the supply line opening, the engagement of the first flat and the second flat resisting rotation of the tailpiece relative to the grommet.

24. The plumbing finish panel assembly of claim 23, wherein the drain line opening includes a resilient seal projecting radially inward from the perimeter of the drain line opening and configured to provide a seal between the perimeter of the drain line opening and a drain pipe disposed to extend through the drain line opening.

25. The plumbing finish panel assembly of claim 23, wherein each of the supply line connector assemblies includes:
a nut having an endwall with an opening therethrough, the opening being dimensioned to receive the outlet end of the tailpiece therethrough, the nut being disposed between the annulus of the grommet and the outlet end of the tailpiece.

26. The plumbing finish panel assembly of claim 23 further comprising:
a circumferential sidewall extending around a periphery of the mounting panel and projecting forward therefrom a distance at least as deep as the thickness of conventional wallboard; and
a cover removably coupled to the circumferential sidewall, the cover substantially enclosing the mounting panel, including the supply line connector assemblies, to protect the supply line connector assemblies from damage or soiling caused by construction activities occurring near the plumbing finish panel assembly.

* * * * *